United States Patent
Lau et al.

(10) Patent No.: US 8,370,581 B2
(45) Date of Patent: Feb. 5, 2013

(54) SYSTEM AND METHOD FOR DYNAMIC DATA PREFETCHING

(75) Inventors: Victor Lau, Marlboro, MA (US);
Pak-lung Seto, Shrewsbury, MA (US);
Eric J. DeHaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1466 days.

(21) Appl. No.: 11/172,226

(22) Filed: Jun. 30, 2005

(65) Prior Publication Data

US 2007/0005903 A1    Jan. 4, 2007

(51) Int. Cl.
*G06F 13/00* (2006.01)

(52) U.S. Cl. .................................. 711/137; 712/217

(58) Field of Classification Search ............... 712/207; 711/137
See application file for complete search history.

(56) References Cited

U.S. PATENT DOCUMENTS

| | | | |
|---|---|---|---|
| 3,898,624 A | 8/1975 | Tobias | |
| 2003/0028694 A1* | 2/2003 | Aboulenein et al. | 710/107 |
| 2004/4012304 | 6/2004 | Rotithor et al. | |
| 2004/0148470 A1* | 7/2004 | Schulz | 711/137 |
| 2004/0205298 A1* | 10/2004 | Bearden et al. | 711/137 |
| 2004/0268050 A1* | 12/2004 | Cai et al. | 711/137 |

FOREIGN PATENT DOCUMENTS

| | | | |
|---|---|---|---|
| JP | 2-122345 A | 5/1990 | |
| JP | 6-095810 A | 8/1994 | |
| JP | 6-324990 A | 11/1994 | |
| JP | 2000-048586 A | 2/2000 | |
| JP | 2002-342154 A | 11/2002 | |
| JP | 2003-296266 A | 10/2003 | |
| JP | 2003-337764 A | 11/2003 | |

OTHER PUBLICATIONS

International Preliminary Report on Patentability for International Application No. PCT/US2006/025747 filed Jun. 29, 2006.
Written Opinion of the International Searching Authority for International Application No. PCT/US2006/025747 filed Jun. 29, 2006.

* cited by examiner

*Primary Examiner* — Edward Dudek, Jr.
(74) *Attorney, Agent, or Firm* — Blakely, Sokoloff, Taylor & Zafman LLP

(57) ABSTRACT

According to one embodiment of the invention, a method comprises measuring memory access latency for a prefetch cycle associated with a transmission of data from a memory device to a destination device such as a storage device. Hereafter, the prefetch rate is dynamically adjusted based on the measured memory access latency.

18 Claims, 4 Drawing Sheets

SYSTEM AND METHOD FOR DYNAMIC DATA PREFETCHING

FIELD

Embodiments of the invention relate to the field of data storage, in particular, to a dynamic data prefetching mechanism for storage devices.

GENERAL BACKGROUND

For many years, computers are implemented with a processor (e.g. central processing unit "CPU"), semiconductor-based host memory, and one or more storage devices. Typically, the host memory is adapted to store data, such as instructions or other types of digital data for example, which needs to be quickly accessed by the processor. For instance, when the computer is in normal operation, the host memory usually contains main portions of its operating system and some or all of the application programs and related data that are currently being used. One type of host memory is random access memory (RAM) that is located in close physical proximity to the processor of the computer.

In contrast with host memory, a storage device provides a physical medium for storing larger amounts of data that is less frequently used than the data contained in host memory. Hence, in order to reduce overall computer costs, the size of host memory is typically limited, which requires data to be frequently transmitted from host memory to the storage device.

During each transmission to the storage device, a time delay is normally experienced. This time delay is the sum of both memory access latency and the data transmit time over a transmit path. The data transmit time is based on the link rate being the rate of communication to the storage device over an interconnect.

When the memory access latency is greater than the data transmit time for a given link rate, the storage device needs to prefetch data frames in order to eliminate link idle time on the transmit path.

Currently, this prefetch rate is a constant value that is either hardcoded or programmed into a control register by driver software of the storage device. The prefetch rate is chosen based on a number of factors, such as estimated average memory access latency and a data transmit time that is fixed based on the estimated transmission rate of the selected interconnect. The maximum number of data frames to prefetch is based on available transmit buffer space.

However, in actual operating conditions, the memory access latency is not a constant value, but varies in response to operational conditions of the computer. These operational conditions may involve increased or decreased memory traffic within the computer or alterations in the type of interface or communication protocols utilized by the storage device. In short, the current prefetch mechanism does not account for real-time operational conditions detected during various prefetch cycles.

BRIEF DESCRIPTION OF THE DRAWINGS

The invention may best be understood by referring to the following description and accompanying drawings that are used to illustrate embodiments of the invention.

DETAILED DESCRIPTION

Figure 1:
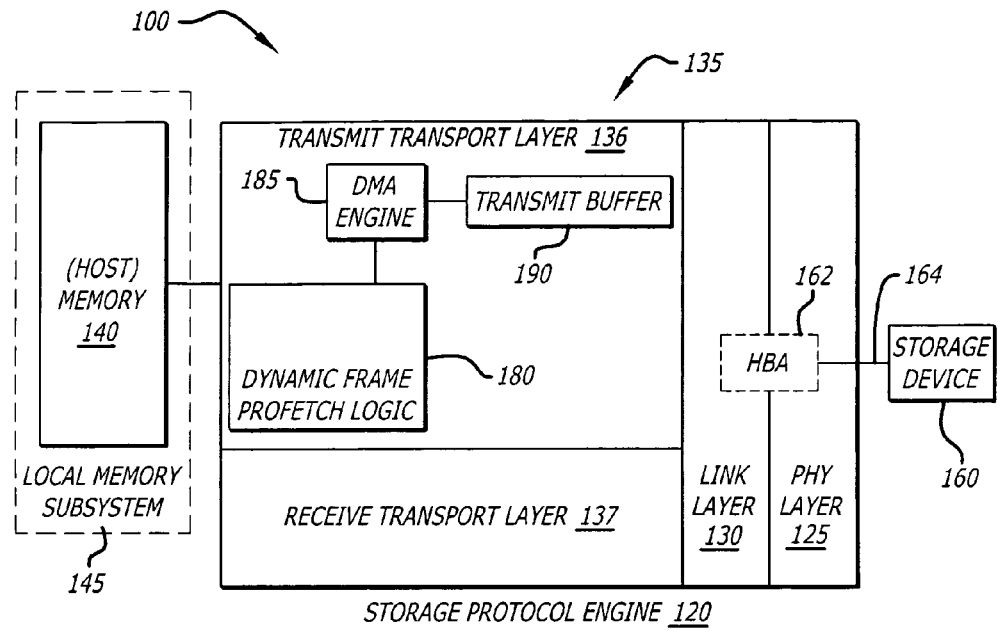
FIG. 1 is a first exemplary block diagram of a computing device illustrated in OSI layout employing the present invention.

Herein, certain embodiments of the invention relate to a dynamic data prefetching mechanism for storage devices. The dynamic data prefetching mechanism provides a real-time determination of the prefetch rate in order to sustain a current link rate and substantially eliminate link idle time. According to one embodiment of the invention, the prefetch rate is automatically determined in real-time, and is adjusted based on measurements of memory access latency for a frame of data being prefetched.

This dynamic adjustment of the prefetch rate provides a number of benefits. For instance, a computing device utilizes its interconnect to a storage device more efficiently and provides better load balancing over its memory subsystem through avoidance of excessive data prefetching. Excessive data prefetching not only wastes memory bus bandwidth, but also increases flush time of a transmit buffer when the computing device incurs a restart or abort input/output (I/O) sequence condition.

In the following description, certain terminology is used to describe features of the invention. For example, the term "computing device" is a device supporting multiple storage levels for data, such as one or more semiconductor memory devices and one or more storage devices. Examples of a computing device include, but are not limited or restricted to computers, portable audio devices or any electronic equipment with data storage. "Data" is broadly defined as any type of information such as digital data as well as address, control or any combination thereof.

The term "memory access latency" is generally considered the time needed to access a predetermined amount of data within local memory. "Data transmit time" is generally equivalent to the time needed to transfer that data to the storage device over a link. This time is either predetermined or negotiated per connection when a connection is established with a destination device. The "destination device" may be a storage device or any device required to conduct prefetch operations to maintain an optimal link rate on the link. One type of optimal link rate is a maximum transmission rate supported by the link, but less than the maximum transmission rate may be optimal in certain configurations.

The term "logic" is generally defined as hardware and/or software that perform one or more operations such as measuring the elapsed time that to prefetch data from a memory device. This measured time constitutes memory access latency during a prefetch cycle. For instance, a "storage protocol engine" is logic that measures memory access latency and adjusts prefetch rates based in part on the measured memory access latency.

A "software module" is executable code such as an operating system, an application, an applet, a routine or even one or more instructions. Software modules may be stored in any type of memory, namely suitable storage medium such as a programmable electronic circuit, any type of semiconductor memory device such as a volatile memory (e.g., random access memory, etc.) or non-volatile memory (e.g., read-only memory, flash memory, etc.), a floppy diskette, an optical disk (e.g., compact disk or digital versatile disc "DVD"), a portable drive, a hard drive disk, a digital tape or the like.

The term "frame" is generally defined as a sequence of data of a predetermined size. For instance, a frame of data in accordance with Serial Attached Small Computer System Interface (SAS) Serial SCSI Protocol (referred to as "SAS SSP") has a maximum predetermined size of one kilobyte (1 KB).

A "link" is generally defined as an information-carrying medium that establishes a communication pathway. The link may be a wired interconnect, where the medium is a physical medium (e.g., electrical wire, optical fiber, cable, bus traces, etc.) or a wireless interconnect (e.g., air in combination with wireless signaling technology).

In the following description, numerous specific details are set forth. However, it is understood that embodiments of the invention may be practiced without these specific details. In other instances, well-known circuits, structures and techniques have not been shown in detail in order not to obscure the understanding of this description.

Referring to FIG. 1, a first exemplary block diagram of a computing device illustrated in an Open Systems Interconnect (OSI) layout employing the present invention. Computing device 100 comprises a storage protocol engine 120 in communication with both a destination device 160 and semiconductor memory 140 (e.g., host or local memory) being part of a local memory subsystem 145. It is contemplated that storage protocol engine 120 may be integrated within internal circuitry of computing device 100 (e.g., a chipset such as a memory controller hub "MCH" or I/O controller hub "ICH") or within an external controller implemented within destination device 160.

As shown, for this illustrative embodiment of the invention, destination device 160 is a storage device that provides a physical medium for storing data, which is normally less frequently used than the data contained in the memory 140. Examples of storage device 160 include any type of mass storage equipment such as one or more disk drives, tape drives, or the like. It is contemplated that embodiments of the invention may be accomplished According to this embodiment of the invention, storage device 160 is interconnected as part of computing device 100 through a serial communication pathway that may feature a host bus adapter (HBA) 162 and a first link 164. Examples of HBA 162 includes, but is not limited or restricted to a Fiber Channel host bus adapter (FC HBA), an internet small computer system interface HBA (iSCSI HBA), a serial attached SCSI HBA (SAS HBA), or the like.

As further shown, storage protocol engine 120 comprises a physical layer 125, data link layer 130 and a transport layer 135. Physical layer 125 defines the physical characteristics of an interface of storage protocol engine 120 communicatively coupled to storage device 160. These physical characteristics include mechanical and electrical aspects relating to the connection of storage protocol engine 120 to link 164. Data link layer 130 is configured to assemble frames of data with a suitable format for transmission to storage device 160 as well as coordinate the flow of these frames.

Transport layer 135 is configured to monitor and regulate the flow of data into and out of storage protocol engine 120. Transport layer 135 comprises a transmit transport layer 136 and a receive transport layer 137. Transmit transport layer 136 monitors and regulates the flow of data from memory 140 to storage device 160 while receive transport layer 137 monitors and regulates the flow of data from storage device 160 to memory 140. For one embodiment of the invention, dynamic frame prefetching operations are handled within the transmit transport layer 136 as described below.

Herein, transmit transport layer 136 comprises a dynamic frame prefetch logic 180, a direct memory access (DMA) engine 185 and a transmit buffer 190. Upon receiving a command to transmit data from memory 140 to storage device 160, dynamic frame prefetch logic 180 programs DMA engine 185 to prefetch a predetermined amount of the data from memory 140. This predetermined amount is prefetched as "N" successive data frames, where $1 \leq N \leq Max$ and "Max" is a rounded-down, positive whole number of the ratio of the size of transmit buffer 190 (TB_Size) to the size of a data frame (F_Size). The prefetching of data frames is determined in accordance with the following equation:

Prefetch Frame #=round-up[memory access latency/ data transmit time], where

Max=round-down[$TB\_Size/F\_Size$].

For instance, where transmit buffer 190 is four kilobytes (4 KB) in size and a frame of data is 1 KB in size, four frames may be stored in transmit buffer 190. Where initial memory access latency is estimated to be five microseconds (5 μs) in duration and the data transmit time is estimated to be four microseconds (4 μs), two frames would be prefetched. The calculation is determined as follows:

Prefetch Frame #=round-up[5/4]=2, where:

"2" is an acceptable prefetch value since it is less than the max storage (4) of transmit buffer 190.

Thereafter, DMA engine 185 creates data frames and locally stores the data frames within transmit buffer 190.

Figure 2:
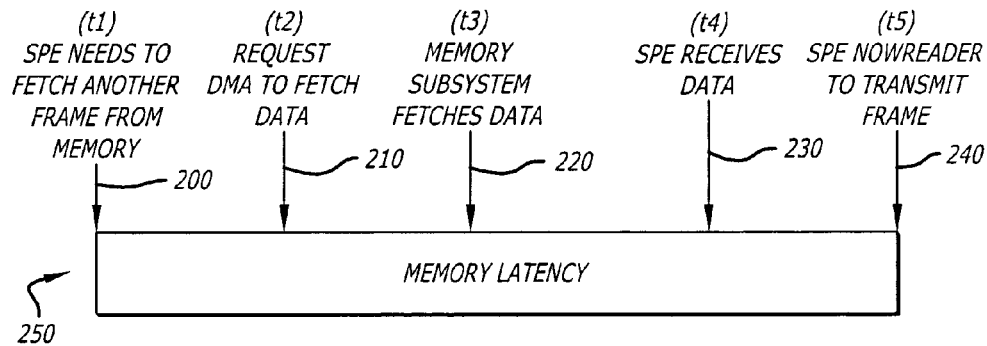
FIG. 2 is an exemplary diagram of the memory access latency and the operations associated with computing the memory access latency.

As shown in FIGS. 1 and 2, at the start (t1) 200 of prefetch cycle 250 when storage protocol engine (SPE) 120 determines that another frame of data needs to be fetched from memory 120, dynamic frame prefetch logic 180 starts a timer to measure the memory access latency for this prefetch cycle. Such determination may be accomplished by monitoring the level of memory capacity of transmit buffer 190.

In addition to starting the timer, dynamic frame prefetch logic 180 programs DMA engine 185 to prefetch the data frame as shown at time t2 210. The data frame is fetched by memory subsystem 145 and returned to SPE 120 at times t3 220 and t4 230. Thereafter, SPE 120 processes the data frame which, at time t5 240, is now ready for transmission to storage device 160. The measured time to retrieve the data frame is used by dynamic frame prefetch logic 180 to perform a real-time recalculation of the number of frames to prefetch in order to sustain the given line rate.

Figure 3:
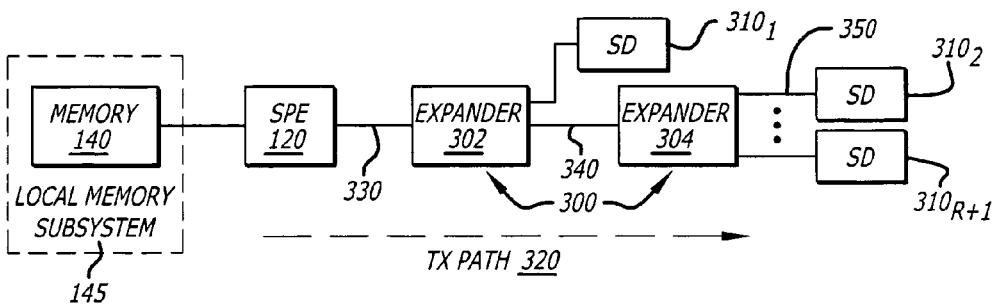
FIG. 3 is a second exemplary embodiment of a computing device illustrated in OSI layout employing the present invention.

Referring now to FIG. 3, a second exemplary embodiment of a computing device illustrated in OSI layout employing the present invention. Herein, computing device 100 comprises storage protocol engine 120 in communication with both semiconductor memory 140 being part of a local memory subsystem 145 and one or more expanders 300 (e.g., expanders 302 and 304). It is contemplated that expander 300 may be a fan-out switch to enable storage protocol engine 120 to be communicatively coupled with and control the transmission of data to multiple storage devices (SD) $310_1$-$310_R$, where R≧2. Of course, it is contemplated that expander 300 may be multiple expanders, as shown, serially coupled together to support a greater number of storage devices.

As shown, the data transmit time is determined based on the lowest link rate in along a transmit path 320. For instance, where a first link rate 330 between storage protocol engine 120 and expander 302 is 6 gigabytes per second (6 Gb), a second link rate 340 between expander 302 and expander 304 is 3 Gb, and a third link rate 350 between expander 304 and targeted storage device $310_2$ is 1.5 Gb, the computed data transmit time will be determined based on a 1.5 Gb link rate, namely the lowest link rate in transmit path 320.

Regardless of the topology of computing device 100, storage protocol engine 120 is adapted to monitor and dynamically alter the prefetch rate based on at least changes to memory access latency, and perhaps changes to data transmit time. Albeit, changes to data transmit time are substantially less frequent than changes in memory access latency.

Figure 4:
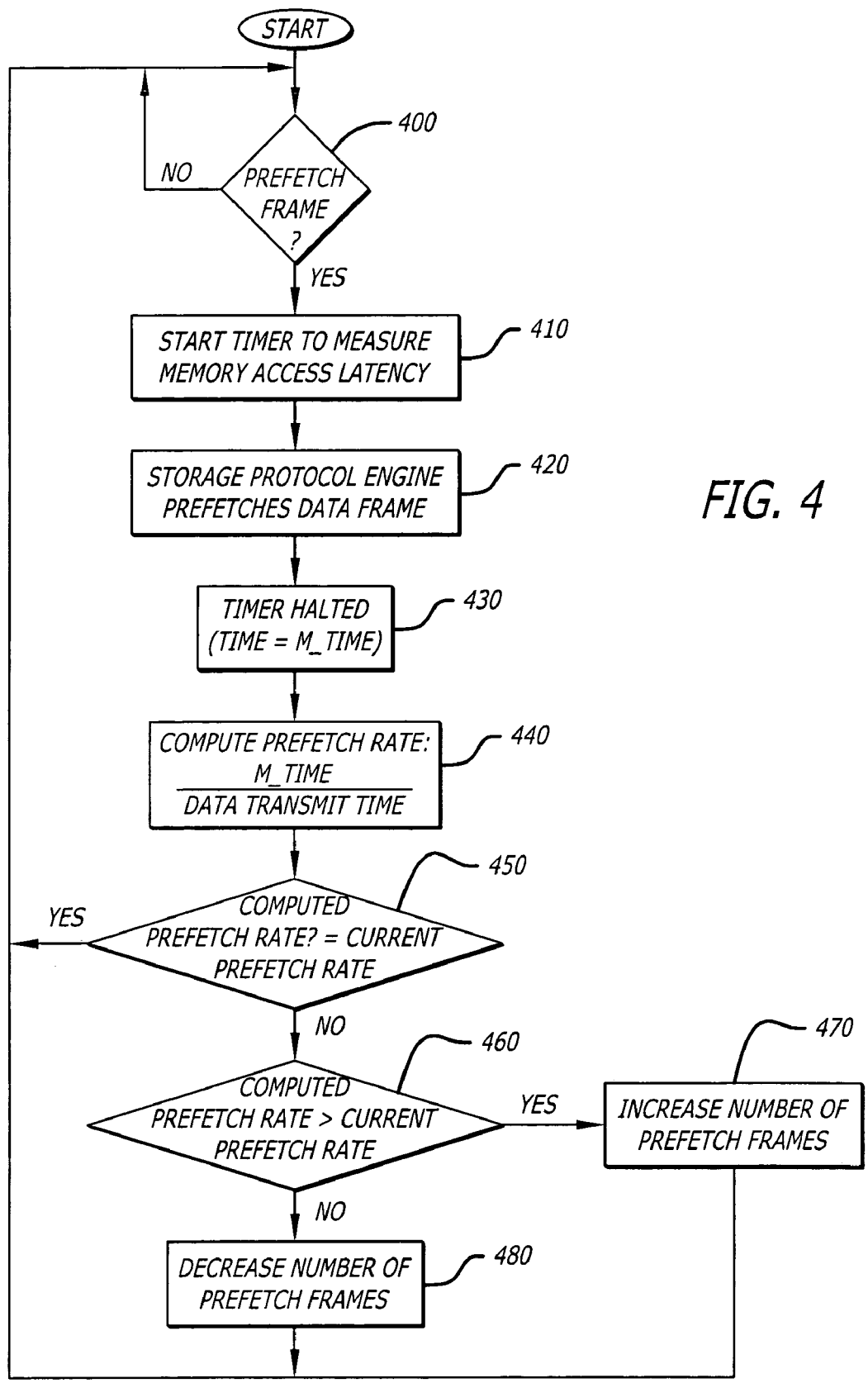
FIG. 4 is an exemplary embodiment of a flowchart illustrating the operations of the dynamic frame prefetching logic for handling variations in memory access latency.

Referring to FIG. 4, an exemplary embodiment of a flowchart illustrating the operations of the dynamic frame prefetching logic for handling variations in memory access latency is shown. Upon the storage protocol engine determining that one or more additional frames need to be prefetch from memory (block 400), which occurs prior to the DMA engine issuing a Read command to the memory subsystem to access a selected data frame, a timer is started by the dynamic frame prefetching logic to measure the memory access latency (block 410). Upon the storage protocol engine receiving the data identified in the Read command and processing the data to a point where SPE is now ready to transmit the data frame, the timer is halted (blocks 420 and 430). This measured time (M_Time) is used to recalculate the prefetch rate (block 440) as set forth in the equation below:

Prefetch rate=round-up[$M$_time/data transmit time]

As a result, the prefetch rate is a real-time value based on the memory access latency computed for a current prefetch cycle and is adjusted as shown in blocks 450-480. It is contemplated that the idle link time may not be eliminated instantaneously, but will be substantially mitigated and perhaps completely eliminated for subsequent prefetch cycles.

Figure 5:
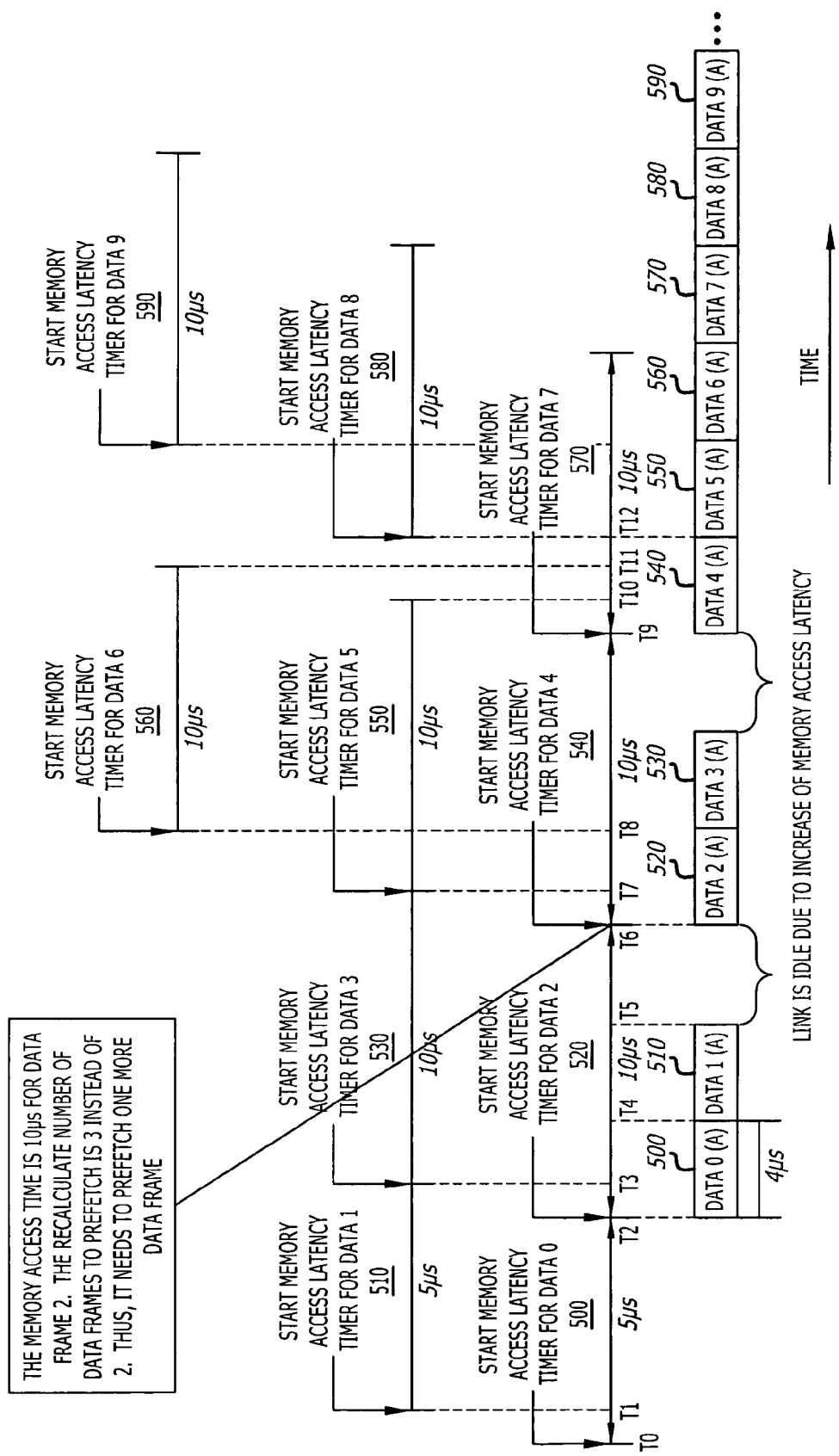
FIG. 5 is an exemplary embodiment of a timing diagram illustrating the operations of the dynamic frame prefetching logic for handling increased memory access latency.

Referring to FIG. 5, an exemplary embodiment of a timing diagram illustrating the operations of the dynamic frame prefetching logic for handling increased memory access latency is shown. Herein, for illustrative purposes, the initial memory access latency is equal to 5 µs in duration and the data transmit time is estimated to be 4 µs in duration. Hence, two frames (e.g., round-up[5/4]) would be prefetched in order to sustain the link rate. The transmit buffer is configured to store up to four (4) data frames.

As shown, beginning at time T0, two frames of data are prefetched and corresponding timers are started to measure memory access latency associated with these prefetching operations. More specifically, the dynamic frame prefetching logic starts a first timer to measure memory access latency experienced during a first prefetch cycle when fetching a first data frame (DATA0 500). Generally concurrent to the start of a first timer, at time T1, the dynamic frame prefetching logic starts a second timer to measure memory access latency for fetching a second data frame (DATA1 510).

At time T2, DATA0 500 has been received by the protocol storage engine and is ready for transmission to the storage device. The first timer is halted and the prefetch rate is recalculated based on the measured memory access latency and the constant data transmit time. Since the measured memory access latency to fetch DATA0 500 is 5 µs for this illustrative embodiment, the prefetch rate remains at two data frames.

Since the transmit buffer is sufficient size to hold up to 4 data frames, at times T2, a third frame of data, represented as "DATA2" 520, is prefetched and its corresponding (third) timer are started. DATA0 500 is also transmitted from the storage protocol engine to the storage device over link 164 of FIG. 1.

In addition, at time T3, DATA1 510 has been received by the protocol storage engine and is ready for transmission to the storage device. The second timer is halted and the prefetch rate is recalculated based on the measured memory access latency and the fixed data transmit time. Again, since the measured memory access latency to fetch the second data frame was determined to be 5 µs for this illustration, the prefetch rate remains at two data frames. A fourth frame of data, represented as "DATA3" 530, is prefetched and its corresponding (fourth) timer is started.

At time T4, DATA0 500 has been fully transmitted from the storage protocol engine to the storage device over link 164 of FIG. 1. Hence, the transmission of DATA1 510 commences and is completed by T5.

At time T6, the protocol storage engine has received DATA2 520, which is now ready for transmission to the storage device. The third timer is halted and the prefetch rate is recalculated based on the measured memory access latency and the fixed data transmit time. Since the measured memory access latency to fetch DATA2 520 has increased to 10 µs for this illustration, the prefetch rate now increases to three (3) data frames computed as follows: round-up[10/4]=3. Hence, a fifth data frame 540, represented as "DATA4" 540, is prefetched.

At time T7, DATA3 530 has been received by the protocol storage engine and is ready for transmission to the storage device. The fourth timer is halted and the prefetch rate is recalculated based on the measured memory access latency and the constant data transmit time. Since the measured memory access latency to fetch DATA3 530 remains at 10 µs for this illustration, the prefetch rate remains at three data frames. Hence, at time T7, a sixth data frame 550, represented as "DATA5" 550, and subsequently a seventh data frame 560 at time T8, represented as "DATA6" 560, are prefetched with corresponding (sixth & seventh) timers started.

At time T9, DATA4 540 has been received by the protocol storage engine and is ready for transmission to the storage device. The fifth timer is halted and the prefetch rate is recalculated based on the measured memory access latency and the constant data transmit time. Since the measured memory access latency to fetch DATA4 540 remains at 10 µs for this illustration, the prefetch rate remains at three data frames. Hence, an eighth data frame, represented as "DATA7" 570, is prefetched with an eighth timer is started.

At times T10 and T11, sixth and seventh data frames 550 and 560 are received by the protocol storage engine and are now ready for transmission to the storage device. Since the measured memory access latency to fetch each of these data frames remains at 10 µs for this illustration, the prefetch rate remains at three data frames. However, at this time, no prefetch operations may occur because data frames 540-560 are currently stored within the transmit buffer and DATA7 570 has been prefetched. Hence, the transmit buffer has been fully allocated.

At time T12, DATA4 540 has been transmitted to the storage device and the transmit buffer is free to store another prefetched data frame. As a result, a ninth data frame 580, represented as "DATA8" 580, is prefetched with a ninth timer started. Similarly, tenth data frame 590, represented as "DATA9" 590, cannot be prefetched until DATA5 540 has been transmitted to the storage device and the transmit buffer is free to store another prefetched data frame.

Figure 6:
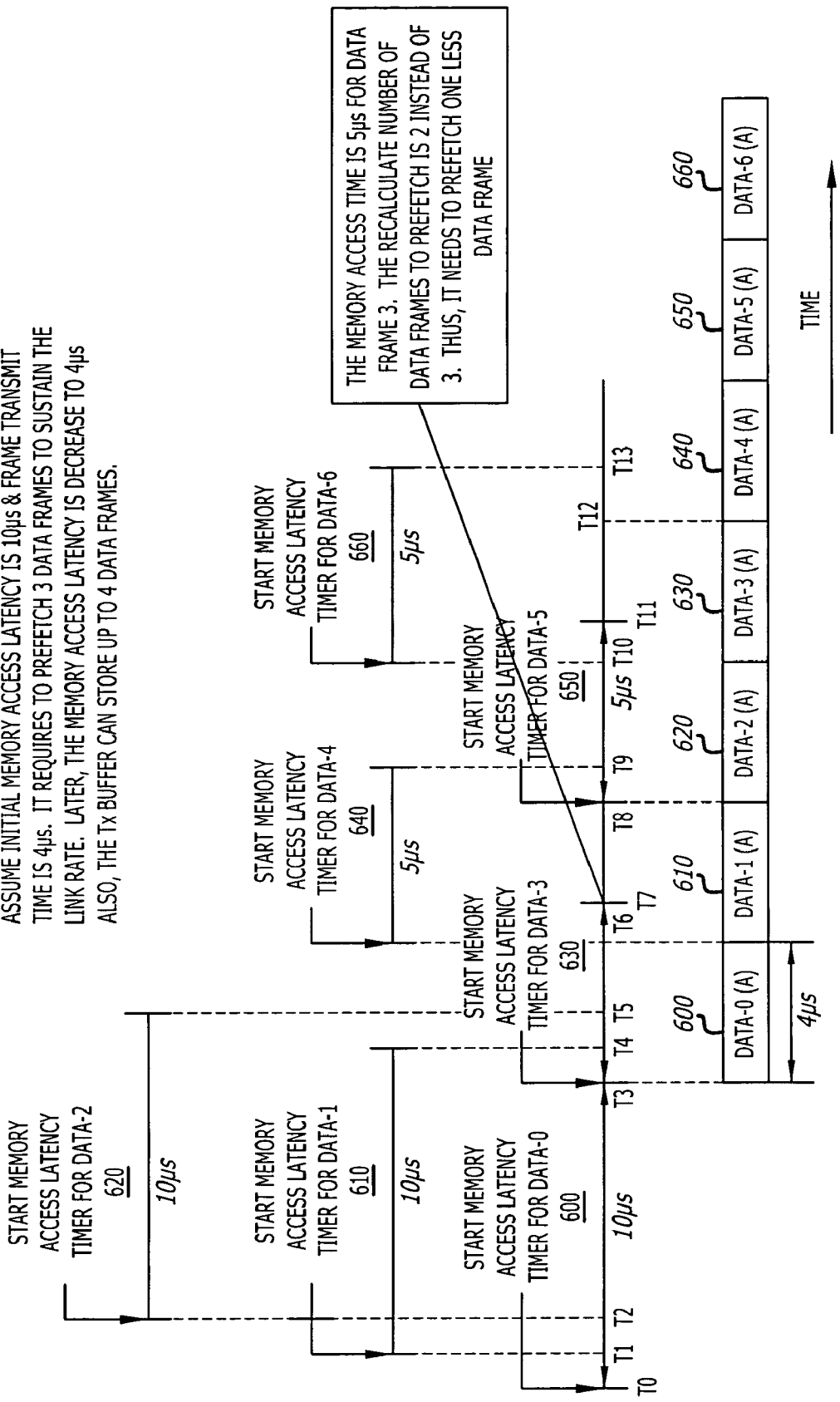
FIG. 6 is an exemplary embodiment of a timing diagram illustrating the operations of the dynamic frame prefetching logic for handling decreased memory access latency.

Referring to FIG. 6, an exemplary embodiment of a timing diagram illustrating the operations of the dynamic frame prefetching logic for handling decreased memory access latency is shown. Similar to FIG. 5, for illustrative purposes, the initial memory access latency is equal to 10 µs in duration and the data transmit time is estimated to be 4 µs in duration. Hence, three frames (round-up[10/4]) would be prefetched in order to sustain the link rate. The transmit buffer is configured to store up to four (4) data frames.

As shown, at times T0-T2, three frames of data are prefetched and corresponding timers are started to measure memory access latency associated with these prefetching operations. More specifically, the dynamic frame prefetching logic starts a first timer to measure memory access latency experienced during a first prefetch cycle when fetching a first data frame (DATA-0 600). Generally concurrent to the start of a first timer, at time T1, the dynamic frame prefetching logic starts (i) a second timer to measure memory access latency for fetching a second data frame (DATA-1 610) and (ii) a third timer to measure memory access latency for fetching a third data frame (DATA-2 620).

At time T3, DATA-0 600 has been received by the protocol storage engine and is ready for transmission to the storage device. The first timer is halted and the prefetch rate is recalculated based on the measured memory access latency and the non-varying data transmit time. Since the measured memory access latency to fetch DATA-0 600 is 10 µs for this illustrative embodiment, the prefetch rate remains at three data frames.

Since the transmit buffer is sufficient size to hold up to 4 data frames, at times T3, a fourth frame of data, represented as "DATA-3" 630, is prefetched and its corresponding (fourth) timer are started. DATA-0 600 is also transmitted from the storage protocol engine to the storage device over link 164 of FIG. 1.

At times T4 and T5, DATA-1 610 and DATA-2 620 are received by the protocol storage engine and are now ready for transmission to the storage device. Since the measured memory access latency to fetch each of these data frames remains at 10 µs for this illustration, the prefetch rate remains at three data frames. However, at this time, no prefetch operations may occur because data frames 600-620 are currently stored within the transmit buffer and DATA-3 620 is being prefetched. Hence, the transmit buffer has been fully allocated.

At time T6, DATA-0 600 has been transmitted to the storage device and the transmit buffer is free to store another prefetched data frame. As a result, a fifth data frame 640, represented as "DATA-4" 640, is prefetched with a fifth timer started.

At time T7, DATA-3 630 is received by the protocol storage engine and is now ready for transmission to the storage device. Since the measured memory access latency to fetch DATA-3 630 has decreased to 5 µs for this illustration, the prefetch rate now decreases to two (2) data frames as computed by the following computation:

Prefetch rate=round-up[5/4]=2

Thus, the storage protocol engine adjusts the prefetch rate appropriately as shown at times T8-T13.

More specifically, at time T8, DATA-1 610 has been transmitted to the storage device and the transmit buffer is free to store another prefetched data frame. As a result, a sixth data frame 650, represented as "DATA-5"-650, is prefetched with a sixth timer started.

At time T9, DATA-4 640 is received by the protocol storage engine and is now ready for transmission to the storage device. Since the measured memory access latency remains at 5 µs for this illustration, the prefetch rate remains at two (2) data frames.

At time T10, before DATA-5 650 is received, DATA-2 620 has been transmitted to the storage device and the transmit buffer is free to store another prefetched data frame. As a result, a seventh data frame 660, represented as "DATA-6" 660, is prefetched with a seventh timer started.

At time T11, DATA-5 650 is received by the protocol storage engine and is now ready for transmission to the storage device. Since the measured memory access latency remains at 5 µs for this illustration, the prefetch rate remains at two (2) data frames.

At time T12, before DATA-6 660 has been received, DATA-3 630 has been transmitted to the storage device and the transmit buffer is free to store another prefetched data frame. As a result, an eighth data frame 670, represented as "DATA-7" 670, is prefetched with an eighth timer started.

At time T13, DATA-6 660 is received by the protocol storage engine and is now ready for transmission to the storage device. Since the measured memory access latency remains at 5 µs for this illustration, the prefetch rate remains at two (2) data frames. This process continues and operates with the process of FIG. 5 to provide a dynamic frame prefetching algorithm.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. For instance, when the prefetch rate is increased, in some situations, a prefetch cycle may be directed to multiple frames in lieu of a series of prefetch cycles each directed to a single data frame.

What is claimed is:

1. A method comprising:
    measuring a memory access latency in real-time for a prefetch cycle associated with a transmission of data from a memory device to a destination device; and
    adjusting a prefetch rate based on a computed ratio of the memory access latency to a data transmit time and conducted in a transmit transport layer of a storage protocol engine implemented between the memory device and the destination device, the data transmit time being an amount of time to transmit the frame of data to the destination device over a link coupled to the destination device and the prefetch rate being a number of frames to prefetch in order to sustain a given link rate by rounding up the computed ratio to a nearest whole number.

2. The method of claim 1, wherein the measuring of the memory access latency includes starting a timer to measure an amount of time required to access a frame of data from the memory device.

3. The method of claim 1, wherein the measuring of the memory access latency is conducted by circuitry in communication with the memory device and includes measuring the memory access latency for each prefetch cycle.

4. The method of claim 3, wherein the adjusting of the prefetch rate is dynamically conducted in real time.

5. The method of claim 3, wherein the adjusting of the prefetch rate is conducted after each prefetch cycle.

6. The method of claim 1, wherein the destination device is a device required to conduct prefetch operations to maintain the given link rate being an optimal link rate on the link, one type of optimal link rate is a maximum transmission rate supported by the link.

7. A computing device comprising:
- a memory device;
- a storage device; and
- a storage protocol engine in communication with the memory device and the storage device, the storage protocol engine to (1) measure a memory access latency in real-time for a prefetch cycle and a constant data transmit time, and (2) dynamically adjust a prefetch rate based on both the measured memory access latency and the data transmit time, the prefetch rate computed as a number of frames to prefetch in order to sustain a given link rate.

8. The computing device of claim 7, wherein the memory device is a random access memory operating as a host memory.

9. The computing device of claim 7, wherein the storage protocol engine comprises
- a direct memory access (DMA) engine;
- a transmit buffer coupled to the DMA engine; and
- a dynamic frame fetching logic coupled to the DMA engine and including a plurality of timers, the dynamic frame fetching logic being adapted to (1) measure the memory access latency for the prefetch cycle associated with a transmission of data from the memory device to the storage device using a timer, and (2) dynamically adjust the prefetch rate based on a ratio between the measured memory access latency and the data transmit time being an amount of time to transmit data from the storage protocol engine to the storage device.

10. The computing device of claim 7 being a computer with the memory device being semiconductor memory.

11. The computing device of claim 7, wherein the storage protocol engine is implemented within the storage device.

12. The computing device of claim 7, wherein the storage protocol engine is implemented within a chipset communicatively coupled to the memory device and the storage device.

13. A storage medium that provides software that, when executed by a computing device, will cause the computing device to perform the following operations:
- measuring a memory access latency in real-time for a prefetch cycle associated with a transmission of data from a semiconductor memory device to a destination device;
- computing a ratio of the memory access latency to a data transmit time where the ratio is used to compute a number of frames to be prefetched in order to sustain a link rate by rounding up the computed ratio to a nearest whole number, the data transmit time being an amount of time to transmit the frame of data to the destination device over a link at the link rate coupled to the destination device; and
- dynamically adjusting a prefetch rate based on the ratio, the prefetch rate being a number of frames of data to prefetch.

14. The storage medium of claim 13 further comprising a software module to start a timer to measure an amount of time required to access a single frame of data from the memory device.

15. The storage medium of claim 13 further comprising a software module to dynamically adjust the prefetch rate in a transmit transport layer of a storage protocol engine implemented between the memory device and the destination device.

16. The storage medium of claim 13, wherein the software to measure the memory access latency for each prefetch cycle.

17. The storage medium of claim 13, wherein the software to measure the memory access latency for each prefetch cycle between the semiconductor memory device to a storage device being the destination device.

18. The storage medium of claim 13, wherein the dynamic adjustment of the prefetch rate based on the ratio substantially eliminates idle time for the link.

\* \* \* \* \*